United States Patent
Wei

(10) Patent No.: US 10,203,509 B2
(45) Date of Patent: Feb. 12, 2019

(54) THREE-DIMENSIONAL DISPLAY DEVICE AND THREE-DIMENSIONAL DISPLAY METHOD

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/113,001

(22) PCT Filed: Dec. 22, 2015

(86) PCT No.: PCT/CN2015/098244
§ 371 (c)(1),
(2) Date: Jul. 20, 2016

(87) PCT Pub. No.: WO2017/020494
PCT Pub. Date: Feb. 9, 2017

(65) Prior Publication Data
US 2018/0136479 A1    May 17, 2018

(30) Foreign Application Priority Data
Jul. 31, 2015 (CN) .......................... 2015 1 0463447

(51) Int. Cl.
*G02B 27/22* (2018.01)
*H04N 13/31* (2018.01)
(Continued)

(52) U.S. Cl.
CPC ......... *G02B 27/2214* (2013.01); *G02B 27/22* (2013.01); *H04N 13/31* (2018.05);
(Continued)

(58) Field of Classification Search
CPC .. G02B 27/225; G02B 27/2228; H04N 13/31; H04N 13/317; H04N 13/366
See application file for complete search history.

(56) References Cited

U.S. PATENT DOCUMENTS 9,746,684 B2 * 8/2017 Kroll ...................... G02B 27/22

FOREIGN PATENT DOCUMENTS

CN   102710956 A   10/2012
CN   102868894 A    1/2013
(Continued)

OTHER PUBLICATIONS

Chinese language International Search Report and Written Opinion, dated May 4, 2016, for PCT/CN2015/098244.
(Continued)

*Primary Examiner* — Dung T Nguyen
(74) *Attorney, Agent, or Firm* — Armstrong Teasdale LLP

(57) ABSTRACT

A three-dimensional display device may include a display panel and a parallax barrier layer arranged thereon. The display panel includes left-eye pixels and right-eye pixels arranged alternately in a first direction. The 3D display device may further include: a tracing unit configured to trace positions of both eyes of a viewer; a determining unit coupled to the tracing unit and configured to determine an offset of the light-shield stripe pattern with respect to a predetermined baseline position in a second direction under a predetermined condition, based on the positions of both eyes of the viewer obtained by the tracing unit; and a controlling unit coupled to the determining unit and configured to transmit a control signal to the parallax barrier layer based on the offset obtained, such that the light-shielding stripe pattern formed by the parallax barrier layer is translatable in the second direction based on the offset.

16 Claims, 6 Drawing Sheets

(51) Int. Cl.
  *H04N 13/366* (2018.01)
  *H04N 13/317* (2018.01)
  *H04N 13/383* (2018.01)
  *H04N 13/398* (2018.01)

(52) U.S. Cl.
  CPC ......... *H04N 13/317* (2018.05); *H04N 13/366* (2018.05); *H04N 13/383* (2018.05); *H04N 13/398* (2018.05); *H04N 2213/001* (2013.01)

(56) References Cited

FOREIGN PATENT DOCUMENTS

| | | |
|---|---|---|
| CN | 103152590 A | 6/2013 |
| CN | 103181174 A | 6/2013 |
| CN | 104252058 A | 12/2014 |
| CN | 104683786 A | 6/2015 |
| CN | 104994373 A | 10/2015 |
| KR | 20130093369 * | 8/2013 |
| TW | 201508338 A | 3/2015 |

OTHER PUBLICATIONS

English language translation of International Search Report and Written Opinion, dated May 4, 2016, for PCT/CN2015/098244 (5 pages).

First Office Action for Chinese Application No. 201510463447.7, dated Sep. 7, 2016 (20 pages).

\* cited by examiner

THREE-DIMENSIONAL DISPLAY DEVICE AND THREE-DIMENSIONAL DISPLAY METHOD

CROSS REFERENCE TO RELATED APPLICATIONS

This application is a National Stage Entry of PCT/CN2015/098244, filed Dec. 22, 2015, which claims priority to Chinese Patent Application No. 201510463447.7, filed on Jul. 31, 2015, the disclosure of each of which is incorporated herein by reference in its entirety.

BACKGROUND

The present disclosure relates to the field of display technology, and in particular to a three-dimensional (3D) display device and a 3D display method.

In a conventional naked-eye three-dimensional (3D) displaying, crosstalk and Moire are two main deficiencies which deteriorate the 3D display effect. Specifically, crosstalk is generated due to the fact that light rays for left-eye images and light rays for right-eye images cannot be completely separated between the left eye and the right eye of a viewer, which results in a ghost image in both eyes of the viewer and a significant deterioration on the display effect. For example, in a conventional parallax-barrier-type 3D display device, the parallax barrier in line with a certain arrangement of left-eye pixels and right-eye pixels may direct light rays emitted from the left-eye pixels and the right-eye pixels towards different directions to form different images for left-eye and right-eye. However, light rays may well easily scatter towards other directions through openings (light-through sections) of the parallax barrier. Such a crosstalk phenomenon cannot be eliminated easily in the prior art.

On the other hand, due to their proximity in terms of spatial frequency between the parallax barrier and pixel arrangement, this type of 3D display device is also subject to severe Moire phenomenon in the meantime.

BRIEF DESCRIPTION

The present disclosure provides in some embodiments a three-dimensional (3D) display device and a 3D display method, which can reduce Moire and crosstalk deficiencies in a parallax-barrier-type 3D display device.

According to a first aspect, a 3D display device is provided. The display device includes a display panel and a parallax barrier layer arranged thereon. The display panel includes left-eye pixels and right-eye pixels arranged alternately in a first direction. The parallax barrier layer is configured to form a light-shielding stripe pattern, in which stripes are arranged in a second direction, so as to separate imaging regions for the left-eye pixels from imaging regions for the right-eye pixels spatially. The 3D display device further includes: a tracing unit configured to trace positions of both eyes of a viewer; a determining unit coupled with the tracing unit and configured to determine an offset of the light-shield stripe pattern with respect to a predetermined baseline position in a second direction under a predetermined condition, based on the positions of both eyes of the viewer obtained by the tracing unit; and a controlling unit coupled with the determining unit and configured to transmit a control signal to the parallax barrier layer based on the offset obtained by the determining unit, so as to enable the light-shielding stripe pattern formed by the parallax barrier layer to translate in the second direction based on the offset.

In one possible embodiment, the light-shielding stripe pattern includes light-shielding stripes and light-through stripes; and the predetermined condition is that a center point between a center on a light-outgoing surface of a left-eye pixel and a center on a light-outgoing surface of a corresponding right-eye pixel, a center point between both eyes of the viewer, and a center point of a corresponding light-through stripe are all arranged in a same straight line.

In one possible embodiment, the first direction and the second direction are coincident with each other.

In one possible embodiment, an angle between the first direction and the second direction is arctan(1/N), where N is an aspect ratio of any one of the left-eye pixels or any one of the right-eye pixels.

In one possible embodiment, the parallax barrier layer includes a liquid crystal layer, such that the light-shielding stripe pattern is formed by controlling orientation of the liquid crystal layer.

In one possible embodiment, the parallax barrier layer further includes a common electrode, and a plurality of strip-like electrodes arranged in parallel in the second direction. A liquid crystal layer is arranged between the common electrode and the plurality of strip-like electrodes. The plurality of strip-like electrodes are connected to a plurality of control signal lines respectively, so as to enable the light-shielding stripe pattern to translate based on the offset by controlling an activation voltage applied to the plurality of control signal lines.

In one possible embodiment, the plurality of strip-like electrodes are grouped into a plurality of electrode sets each including a same number of electrodes in the second direction; a number of electrodes in each electrode set is the same as a number of control signal lines; and the electrodes in each electrode set are connected with the control signal lines respectively.

In one possible embodiment, the 3D display device further includes: an image translation unit configured to enable the image to be displayed to translate in the vicinity of the predetermined baseline position, based on the positions of both eyes of the viewer obtained by the tracing unit.

In one possible embodiment, the parallax barrier layer further includes a substrate on which the light-shielding stripe pattern is formed; and a micro-mechanical mechanism which drives the substrate to move in the second direction.

According to another aspect, a 3D display method is provided. The 3D display method is applied to a 3D display device. The 3D display device includes a display panel and a parallax barrier layer arranged thereon. The display panel includes left-eye pixels and right-eye pixels arranged alternately in a first direction. The parallax barrier layer is configured to form a light-shielding stripe pattern. The method includes: tracing positions of both eyes of a viewer; determining an offset of the light-shield stripe pattern with respect to a predetermined baseline position in a second direction under a predetermined condition, based on the positions of both eyes of the viewer, wherein stripes in the light-shielding stripe pattern are arranged in the second direction, so as to separate imaging regions for the left-eye pixels from imaging regions for the right-eye pixels spatially; and transmitting a control signal to the parallax barrier layer based on the offset, so as to enable the light-shielding stripe pattern formed by the parallax barrier layer to translate in the second direction based on the offset.

In one possible embodiment, the predetermined condition is that a center point between a center on a light-outgoing surface of a left-eye pixel and a center on a light-outgoing surface of a corresponding right-eye pixel, a center point between both eyes of the viewer, and a center point of a corresponding light-through stripe in the light-shielding stripe pattern are all arranged in a same straight line.

In one possible embodiment, the first direction and the second direction are coincident with each other.

In one possible embodiment, an angle between the first direction and the second direction is arctan(1/N), where N is an aspect ratio of any one of the left-eye pixels or any one of the right-eye pixels.

In one possible embodiment, the parallax barrier layer further includes a common electrode, a plurality of strip-like electrodes arranged in parallel in the second direction, and a liquid crystal layer arranged between the common electrode and the plurality of strip-like electrodes, such that the light-shielding stripe pattern is caused to translate based on the offset by controlling an activation voltage applied to a plurality of control signal lines connected to the strip-like electrodes.

In one possible embodiment, the plurality of strip-like electrodes are grouped into a plurality of electrode sets each including a same number of electrodes in the second direction. A number of electrodes in each electrode set is the same as a number of control signal lines. The electrodes in each electrode set are connected to the control signal lines respectively, such that the light-shielding stripe pattern is caused to translate based on the offset by controlling the activation voltage applied to the control signal lines connected to the electrodes in each electrode set.

In one possible embodiment, the method further includes: enabling the image to be displayed to translate in the vicinity of the predetermined baseline position, based on the positions of both eyes of the viewer.

According to embodiments of the present disclosure, an adaptive adjustment is performed on a light-through stripe pattern within the parallax barrier with respect to positions of both eyes of a viewer in conjunction with tracing the positions of both eyes of the viewer. Accordingly, occurrence of Moire can be suppressed effectively. In the meantime, crosstalk deficiency due to scattering of light rays at the light-through openings can also be suppressed. Therefore embodiments of the present disclosure can reduce Moire and crosstalk deficiencies in a parallax barrier-type 3D display device, thereby improving the display effect of such a 3D display device.

BRIEF DESCRIPTION OF THE DRAWINGS

In order to illustrate the present disclosure in a more apparent manner, the drawings desired for the embodiments of the present disclosure will be described briefly hereinafter. Obviously, the following drawings merely relate to some embodiments of the present disclosure, and based on these drawings, a person skilled in the art may obtain other embodiments without any creative effort.

DETAILED DESCRIPTION

In order to make the present disclosure more clear, embodiments of the present disclosure will be clearly and fully described hereinafter in conjunction with the accompanying drawings. Obviously, the described embodiments are merely parts of embodiments of the present disclosure, but not all the embodiments. Based on the embodiments in the present disclosure, all the other embodiments obtained by a person skilled in the art will fall within the protection scope of the present disclosure.

Figure 1:
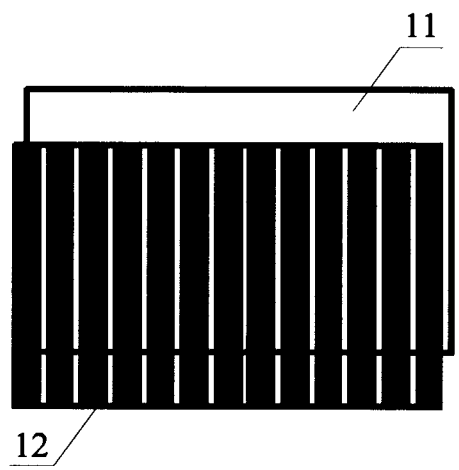
FIG. 1 is a structural diagram illustrating a three-dimensional (3D) display device according to a certain embodiment of the present disclosure.

FIG. 1 is a structural diagram illustrating a three-dimensional (3D) display device according to a certain embodiment of the present disclosure. As shown in FIG. 1, the 3D display device includes a display panel 11 and a parallax barrier layer 12 disposed thereon. It should be noted that the display panel 11 and the parallax barrier 12 are illustrated as detached from each other for the sake of clarity, as shown in FIG. 1. However, the display panel 11 and the parallax barrier 12 are integrated together in a predetermined manner when fabricating such a 3D display device.

Figure 2:
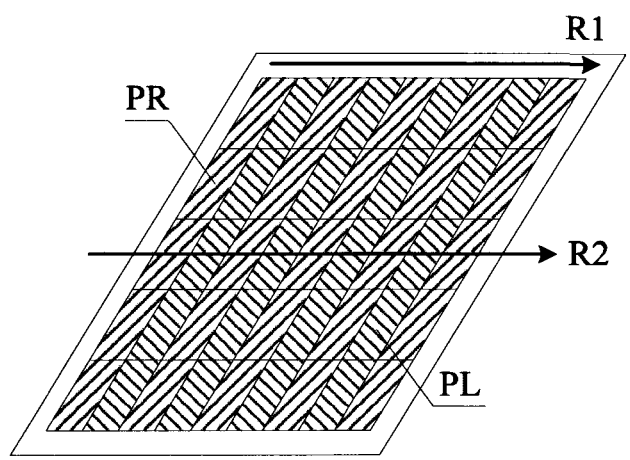
FIG. 2 is a diagram illustrating a pixel arrangement on the display panel shown in FIG. 1.

FIG. 2 is a diagram illustrating a pixel arrangement on the display panel shown in FIG. 1. As shown in FIG. 2, the display panel 11 is provided with left-eye pixels PL and right-eye pixels PR alternately arranged in a first direction R1. Further, the parallax barrier layer 12 is used to form a light-shielding stripe pattern, in which the stripes are arranged in a second direction R2. In embodiments of the present disclosure, for the sake of clarity without obscuring the display panel, in particular its left-eye pixels and right-eye pixels, by the light-shielding stripe pattern, no light-shielding stripe pattern, but only a pixel arrangement on the display panel is shown in FIG. 2. Specifically, either any one of the left-eye pixels PL or any one of the right-eye pixels PR may be a part of display region of the display panel 11, and may only include one monochrome sub-pixel region, or more than one monochrome sub-pixel region and the present disclosure is not limited thereto. Further, the first direction R1 and the second direction R2 may be coincident with each other (the same), as both shown in FIG. 1 and FIG. 2.

Figure 3:
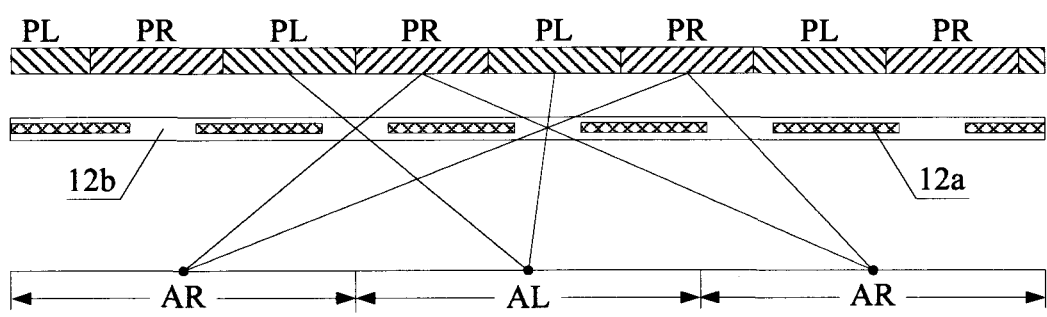
FIG. 3 is a diagram illustrating a working concept of the 3D display device according to a certain embodiment of the present disclosure.

Based on the above, FIG. 3 is a diagram illustrating a working concept of the 3D display device according to a certain embodiment of the present disclosure. As shown in FIG. 3, it shows a diagram of partially cross sectional structure of the 3D display device in the first direction R1 or in the second direction R2. The left-eye pixels PL and the right-eye pixels PR within the display panel 11 are alternately arranged in such a direction. Further, the light-shielding stripe pattern (as shown in FIG. 1) is formed by light-shielding stripes 12a and light-through stripes 12b which are arranged alternately on the parallax barrier layer 12. As such, the above arrangement may well separate imaging regions AL for the left-eye pixels PL from imaging regions AR for the right-eye pixels PR spatially.

Specifically, within the left-eye imaging regions AL as shown in FIG. 3, light rays from the left-eye pixels PL are received along light path as shown in FIG. 3. Put it another way, left-eye images formed by all of left-eye pixels PL may be observed within the left-eye imaging regions AL. Alike, within the right-eye imaging regions AR as shown in FIG. 3, light rays from the right-eye pixels PR are received along light path as shown in FIG. 3. Put it another way, right-eye images formed by all of right-eye pixels PR may be observed within the right-eye imaging regions AR. Based on the above, respective size parameters as shown in FIG. 3 can be designed properly according to pupillary distance of a viewer, thereby achieving a resultant 3D display effect due to optical parallax between the left eye and the right eye of the viewer.

As well appreciated by a skilled person in the art, all size parameters may be illustrated out of proportion in the Figures in order to illustrate a complete light path. Furthermore the left-eye pixels and the right-eye pixels arranged alternately in the first direction may have a different arrangement from the one as shown in FIG. 2. For example, in an alternative embodiment, the left-eye pixels and the right-eye pixels are interleaved in different rows, so as to form a 3D display effect.

It should be appreciated that, the spatial separation between the imaging regions for the left-eye pixels PL and the imaging regions for the right-eye pixels PR does not necessarily mean that these two imaging regions are free from any overlapping. For example, when both the left eye and the right eye of a viewer are placed close to an interface between one of the left-eye imaging regions AL and a corresponding right-eye imaging region AR for observation, it is possible to observe both the left-eye images and the right-eye images simultaneously, and also to result in a severe Moire.

Figure 4:
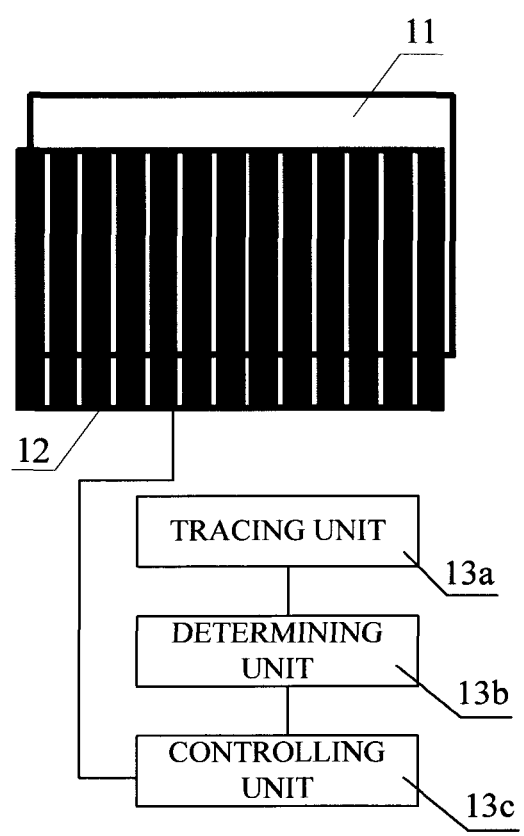
FIG. 4 is a block diagram illustrating the 3D display device according to a certain embodiment of the present disclosure.

To this end, the 3D display device according to embodiments of the present disclosure is to address such a problem by virtue of the following arrangement. As shown in FIG. 4, the 3D display device may further include: a tracing unit 13a configured to trace positions of both eyes of a viewer, which may conduct such a tracing on both eyes according to pictures taken in embodiments of the present disclosure; a determining unit 13b coupled to the tracing unit 13a and configured to determine an offset of the light-shield stripe pattern with respect to a predetermined baseline position in the second direction R2 under a predetermined condition, based on the positions of both eyes of the viewer obtained by the tracing unit 13a; and a controlling unit 13c coupled to the determining unit and configured to transmit a control signal to the parallax barrier layer 12 based on the offset obtained by the determining unit 13b, so as to enable the light-shielding stripe pattern formed by the parallax barrier layer 12 to translate in the second direction R2 based on the offset.

For example, the tracing unit 13a may include a camera disposed at a predetermined position and configured to take pictures of the viewer, or obtain taken pictures of the viewer through the input signals received from the outside. Accordingly, the tracing unit 13a may obtain positions of both eyes of the viewer by conducting processing on the taken pictures. A specific processing method relates to image-based eye feature extraction and coordinate transformation from imaging positions to real positions, which are well appreciated by a skilled person in the art and will not repeated again. Furthermore, the determining unit 13b and the controlling unit 13c may adjust positions of the light-shielding stripe pattern in the second direction R2 accordingly, based on the positions of both eyes of the viewer obtained by the tracing unit 13a.

It should be noted that, the above translation of the light-shielding stripe pattern may refer to either a whole translation of the whole light-shielding stripe pattern itself, or a translation of one or more light-shielding stripes and/or light-through stripes within the light-shielding stripe pattern so as to adjust a width of the light-shielding stripes and/or the light-through stripes. The present disclosure is not limited to a particular method of translation of the light-shielding stripe pattern. Moreover, although the embodiments of the present disclosure are described for a situation where there is only one viewer, the disclosure is also applicable to another situation where there is more than one viewer.

Figure 5:
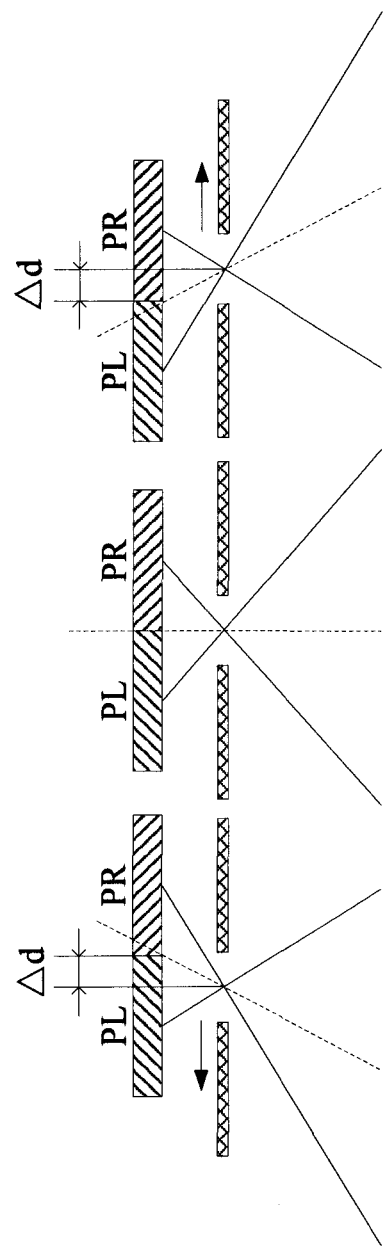
FIG. 5 is a diagram illustrating a concept about how to adjust a light-shielding stripe pattern according to a certain embodiment of the present disclosure.

FIG. 5 is a diagram illustrating a concept about how to adjust a light-shielding stripe pattern according to a certain embodiment of the present disclosure. More specifically, FIG. 5 illustrates a pair of the left-eye pixel PL and its neighboring right-eye pixel PR taken as an example, in series from left to right, a situation where both eyes are displaced to the left from their corresponding baseline positions, another situation where both eyes are located at their corresponding baseline positions, and yet another situation where both eyes are displaced to the right from their corresponding baseline positions. These three situations all meet the following predetermined condition, that is, a center point between a center on a light-outgoing surface of a left-eye pixel PL and a center on a light-outgoing surface of a neighboring right-eye pixel PR, a center point between both eyes of the viewer, and a center point of a corresponding light-through stripe 12b are all arranged in a same straight line (as shown by a dotted line). Therefore, while the positions of both eyes of a viewer are determined as displacement on the left, coincidence with baseline position, or displacement on the right as shown in FIG. 5 by the determining unit 13b, three offsets of the light-shielding stripe pattern, i.e., −Δd, 0 and Δd, with respect to a predetermined baseline position in the second direction R2 for the above three situations can be calculated according to the predetermined conditions. Accordingly, the controlling unit 13c transmits a corresponding control signal to the parallax barrier layer 12, so as to enable the light-shielding stripe pattern formed by the parallax barrier layer 12 to translate by −Δd, 0 and Δd for the above three situations in the second direction R2, as shown in FIG. 5.

It should be appreciated that, it is almost impossible to strictly meet such a predetermined condition at respective positions, due to the fact that both light-shielding stripes 12a and light-through stripes 12b within the light-shielding stripe pattern have a certain width. As a result, such a predetermined condition can only be deemed as an ideal condition for approach by approximation. Moreover, by reference to the above predetermined condition, a skilled person may well obtain other predetermined conditions in different formats or for achieving other targets set in advance. The present disclosure is not limited thereto. As well appreciated by a skilled person in the art, all size parameters may be illustrated out of proportion in order to illustrate a complete light path in FIG. 5.

Therefore, according to the above embodiment of the present disclosure, an adaptive adjustment for light-through openings within the parallax barrier is performed with respect to positions of both eyes of a viewer in conjunction with tracing the positions of both eyes of the viewer. Accordingly, occurrence of Moire can be suppressed effectively. In the meantime, crosstalk deficiency due to scattering of light rays at the light-through openings can also be suppressed. Therefore the above embodiment of the present disclosure can reduce Moire and crosstalk deficiencies in a parallax-barrier-type 3D display device, thereby improving the display effect of such a 3D display device.

Figure 6:
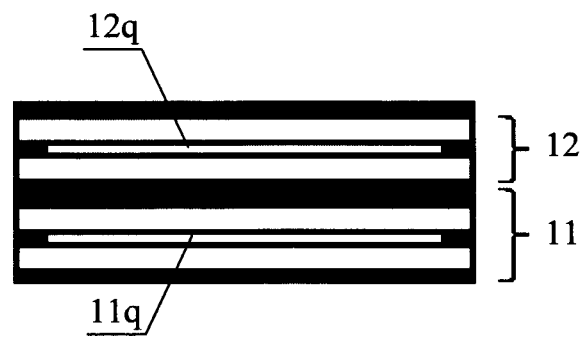
FIG. 6 is a cross sectional diagram illustrating the 3D display device according to a certain embodiment of the present disclosure.

It should be appreciated that the light-shielding stripe pattern formed by the parallax barrier layer 12, under the control of a controlling signal, may translate in the second direction R2. FIG. 6 is a cross sectional diagram illustrating the 3D display device according to a certain embodiment of the present disclosure. On the basis of any one of the 3D display devices described herein, the display panel 11 may include a first liquid crystal layer 11q, while the parallax barrier layer 12 may include a second liquid crystal layer 12q. Therefore the display panel 11 is to display based on a liquid crystal displaying principle, while the parallax barrier layer 12 forms the light-shielding stripe pattern based on the liquid crystal displaying principle. It should be appreciated by a skilled person in the art that, ways for forming light-shielding stripe pattern is not limited to those disclosed by embodiments of the present disclosure.

Figure 7:
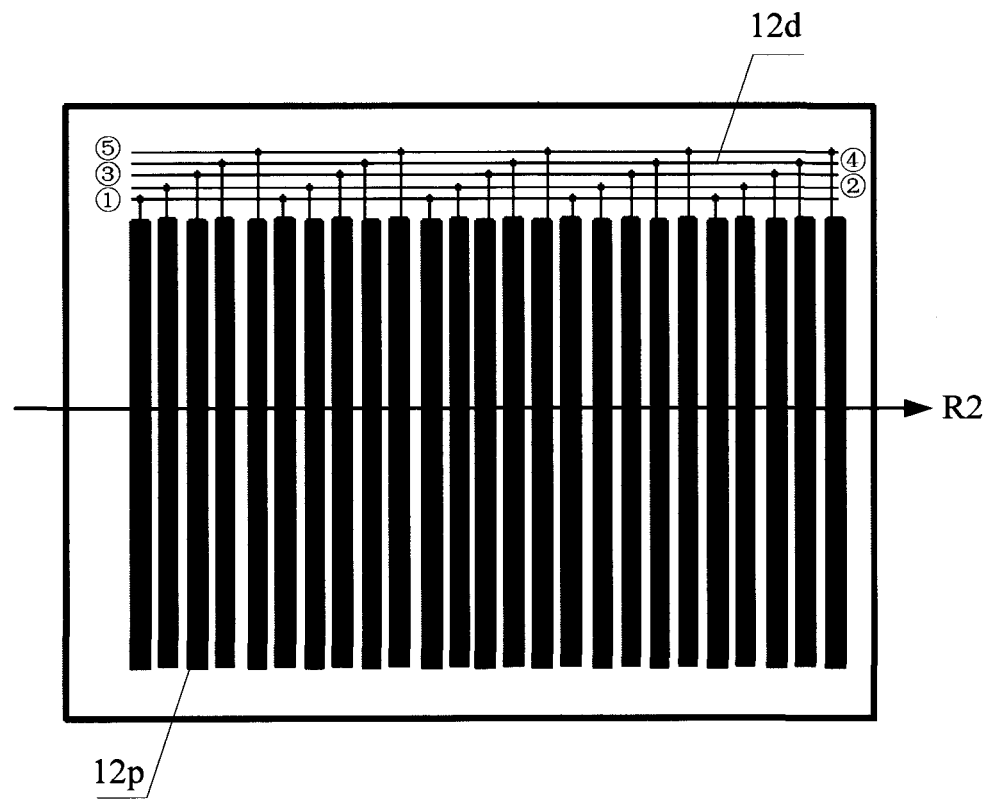
FIG. 7 is a diagram illustrating an arrangement of the strip-like electrodes according to a certain embodiment of the present disclosure.

In one possible embodiment, the parallax barrier layer 12 may further include a common electrode (not shown) and a plurality of strip-like electrodes 12p arranged in parallel in the second direction R2, as shown in FIG. 6 and FIG. 7. Specifically, the liquid crystal layer 12q is arranged between the common electrode and the plurality of strip-like electrodes 12p, while the plurality of strip-like electrodes 12p are connected with a plurality of control signal lines 12d, so as to enable the light-shielding stripe pattern to translate based on the offset by controlling an activation voltage applied to the plurality of control signal lines 12d.

In one possible embodiment, the plurality of strip-like electrodes are grouped into a plurality of electrode sets each including a same number of electrodes in the second direction R2. In other words, the plurality of strip-like electrodes are arranged periodically according to a repetition set, within which the plurality of strip-like electrodes are connected with the plurality of control signal lines in a one-to-one manner.

As an example, as shown in FIG. 7, the plurality of strip-like electrodes 12p is arranged in parallel in the second direction R2. Specifically, the plurality of strip-like electrodes 12p is arranged periodically by having five electrodes 12p as one repetition set. Within each of the repetition sets, five strip-like electrodes 12p are connected with five control signal lines 12d in a one-to-one manner. As a result, in the situation where the common electrode is provided with a common voltage, according to an activation voltage applied to five control signal lines 12d, corresponding light-shielding regions and light-through regions are formed in the liquid crystal layer 12q and arranged periodically in accordance with the repetition set, thereby corresponding light-shielding stripes and light-through stripes of the light-shielding stripe pattern are formed. In one possible embodiment of the present disclosure, when the light-shielding stripes need to be adjusted based on the above offset, selected control signal lines out of the five control signal lines are provided with the activation voltage to determine which strip electrodes 12p within each repetition set in the parallax barrier layer 12 are activated, according to control signals from the controlling unit 13c. Specifically, provided that five control signal lines 12d are numbered as 1, 2, 3, 4, and 5 from bottom to top, different combinations of control signal lines {1,2,3}, {2,3,4}, {3,4,5}, {4,5,1}, and {5,1,2} provided with the activation voltage may result in the light-shielding stripe pattern having five different offsets.

Furthermore, in other embodiments of the present disclosure, the parallax barrier layer 12 may further include a substrate on which the light-shielding stripe pattern is formed; and a micro-mechanical mechanism which drives the substrate to move in the second direction R2. Alternatively, the parallax barrier layer 12 may specifically include an e-ink screen, which can form the light-shielding stripe pattern having different offsets under the control of a control signal.

Figure 8:
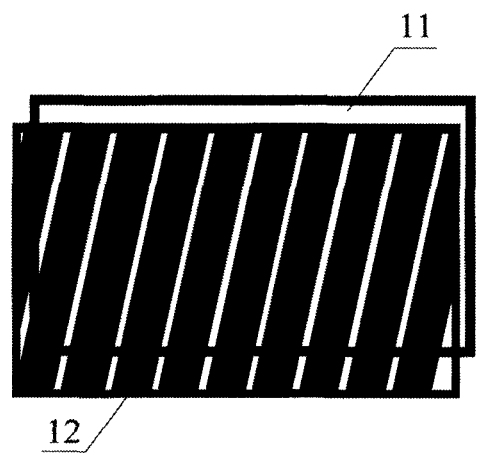
FIG. 8 is a structural diagram illustrating a 3D display device according to another embodiment of the present disclosure.

As another example, FIG. 8 is a structural diagram illustrating a 3D display device according to another embodiment of the present disclosure. What is the same with any one of the above 3D display devices is that the 3D display device in this example includes a display panel 11 and a parallax barrier layer 12 disposed thereon alike. It should be noted that, in this example, the display panel 11 and the parallax barrier layer 12 are illustrated as detached from each other for the sake of clarity, as shown in FIG. 8. However, the display panel 11 and the parallax barrier 12 are integrated together in a predetermined manner when fabricating such a 3D display device. In this example, what is different from any one of the above 3D display devices is that there is a certain angle formed between the first direction R1 and the second direction R2. Specifically, an angle between the first direction R1 and the second direction R2 is arctan(1/N), where N is an aspect ratio of any one of the left-eye pixels PL or any one of the right-eye pixels PR.

Figure 9:
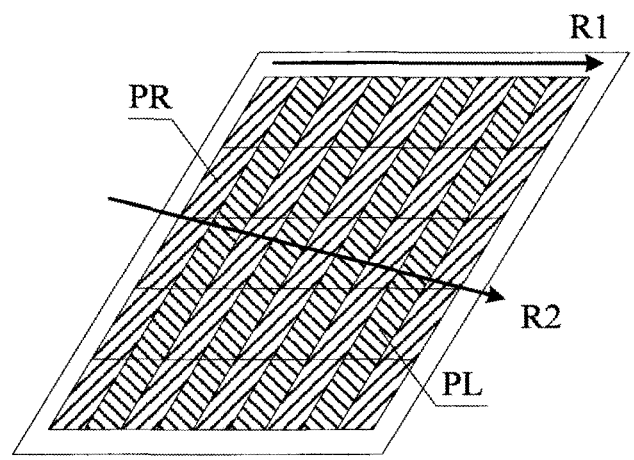
FIG. 9 is a diagram illustrating a pixel arrangement on the display panel shown in FIG. 8.

Specifically, FIG. 9 is a diagram illustrating a pixel arrangement on the display panel shown in FIG. 8. As shown in FIG. 9, the display panel 11 is provided with a plurality of columns of left-eye pixels PL and right-eye pixels PR. The plurality of columns of left-eye pixels PL and right-eye pixels PR are alternately arranged in a first direction R1 (i.e. in a row direction). Further, the parallax barrier layer 12 is configured to form a light-shielding stripe pattern, in which the stripes are arranged in a second direction R2, as shown in FIG. 8 and FIG. 9. Of course, although the second direction R2 is tilted towards the bottom right as shown both in FIG. 8 and in FIG. 9, it can also be tilted towards the bottom left, the upper right or the upper left, and the present disclosure is not limited to any particular direction of the tilt. It should be appreciated that, although there is a certain angle between the first direction R1 and the second direction R2, both cross sectional arrangement of the 3D display device and the working principle thereof can be understood by referring to those shown in FIG. 3. The display panel 11 and the parallax barrier layer 12 in this embodiment of the present disclosure may have the same arrangement as above or corresponding arrangement as the above, which will not be elaborated here.

As shown in FIG. 9, the light-shielding stripes 12a and the light-through stripes 12b arranged alternately in the second direction R2 are parallel to a diagonal of any one of the left-eye pixels PL or the right-eye pixels PR. In other words, the second direction R2 is perpendicular to a diagonal of any one of the left-eye pixels PL or the right-eye pixels PR. Accordingly, light rays emitted from the left-eye pixels PL can be prevented from entering into the right-eye pixel imaging regions AR, while light rays emitted from the right-eye pixels PR can be prevented from entering into the left-eye pixel imaging regions AL to some extent, thereby suppressing crosstalk from happening. As shown in FIG. 1 and FIG. 2, while the first direction R1 and the second direction R2 are coincident with each other, the light-shielding stripes 12a and the light-through stripes 12b arranged alternately in the second direction R2 are parallel to a column of the left-eye pixels PL or a column of the right-eye pixels PR, thereby suppressing crosstalk from happening as well.

Figure 10:
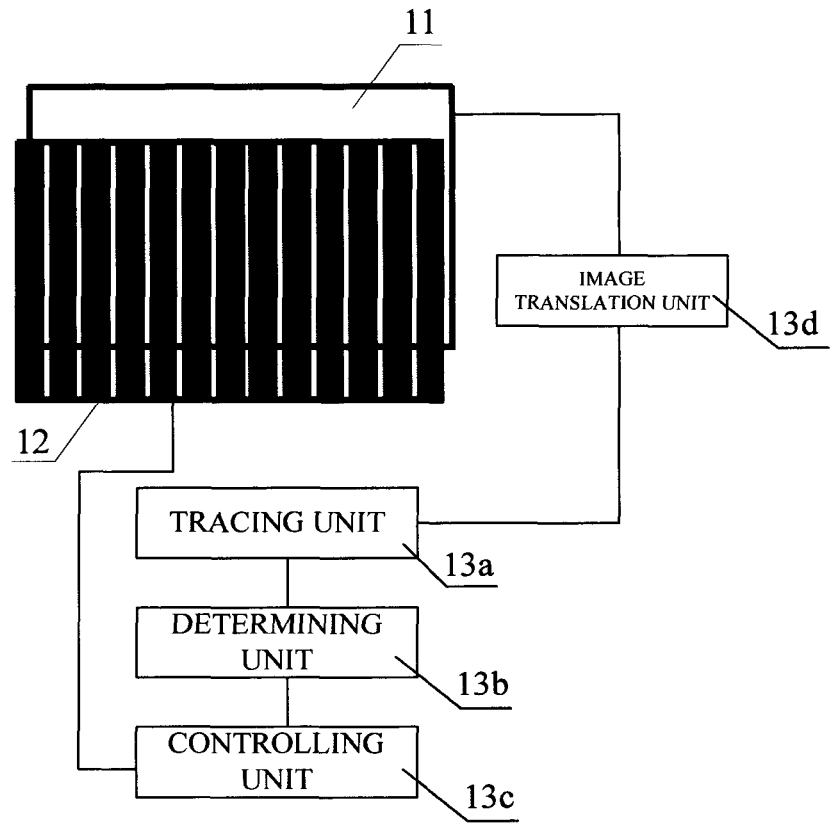
FIG. 10 is a block diagram illustrating the 3D display device according to another embodiment of the present disclosure.

It should also be appreciated that, due to hardware limitation, there may exist limitation imposed on the translation of the light-shielding stripe pattern in terms of precision and range, thereby there may exist a possibility of failing to achieve an improvement on the display effect to an ideal degree. To this end, on the basis of any one of the above 3D display devices, it may further include: an image translation unit 13d (as shown in FIG. 10) configured to enable the image to be displayed to translate in the vicinity of the predetermined baseline position, based on the positions of both eyes of the viewer obtained by the tracing unit 13a. For example, when it is determined that the left-eye of the viewer lies in the current right-eye imaging region AR, while the right-eye of the viewer lies in the current left-eye imaging region AL, the image to be displayed may be caused to translate by a width of one pixel in the first direction R1 as a whole, so as to enable the left-eye pixels AL to display right-eye images, while enabling the right-eye pixels AR to display left-eye images, thereby being suitable for positions of both eyes of the viewer. It should be noted that, the baseline position is a position where both eyes of the viewer are just opposite to an image center. It is appreciated that the above translation is an image translation in an amount of one pixel, which will not change a position of the displayed image significantly. As a result, the translation is limited to "in the vicinity of the baseline position", which is not limited, however, to a translation of solely one pixel, as a skilled person in the art can set up a specific translation range according to real needs.

In addition to the above arrangement, the 3D display device may further include other suitable elements, such as those for supporting, connection, protection, or light-guide purposes. The present disclosure is not limited thereto.

Figure 11:
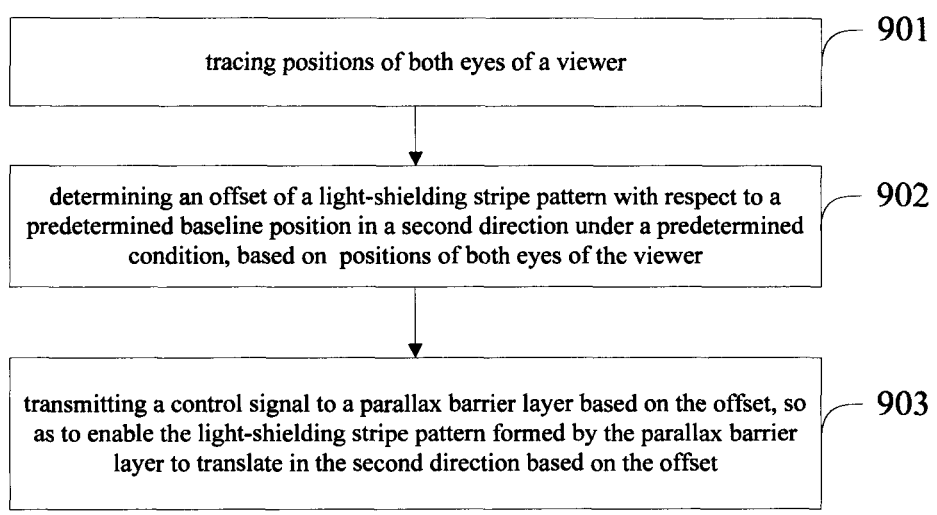
FIG. 11 is a flow chart illustrating a 3D display method according to a certain embodiment of the present disclosure.

With reference also to the embodiments described above, FIG. 11 is a flow chart illustrating a 3D display method according to a certain embodiment of the present disclosure. The 3D display method is applied to a 3D display device, which includes a display panel and a parallax barrier layer arranged thereon. The display panel includes left-eye pixels and right-eye pixels arranged alternately in a first direction. And the parallax barrier layer is configured to form a light-shielding stripe pattern. As shown in FIG. 11, the method includes: Step 901, tracing positions of both eyes of a viewer; Step 902, determining an offset of the light-shield stripe pattern with respect to a predetermined baseline position in a second direction under a predetermined condition, based on the positions of both eyes of the viewer, wherein stripes in the light-shielding stripe pattern are arranged in the second direction, so as to separate imaging regions for the left-eye pixels from imaging regions for the right-eye pixels spatially; and Step 903, transmitting a control signal to the parallax barrier layer based on the offset, so as to enable the light-shielding stripe pattern formed by the parallax barrier layer to translate in the second direction based on the offset.

It is clear that Steps 901 to 903 correspond to functions played by the tracing unit 13a, the determining unit 13b and the controlling unit 13c respectively. Therefore, the corresponding step processes and their embodiments will not be repeated again.

In order to suppress the crosstalk from happening, an angle between the first direction and the second direction is set as arctan(1/N), where N is an aspect ratio of any one of the left-eye pixels or any one of the right-eye pixels. In this way, the light-shielding stripes and the light-through stripes arranged alternately in the second direction are parallel to a diagonal of any one of the left-eye pixels or the right-eye pixels. Accordingly, light rays emitted from the left-eye pixels can be prevented from entering into the right-eye pixel imaging regions, while light rays emitted from the right-eye pixels can be prevented from entering into the left-eye pixel imaging regions to some extent, thereby suppressing crosstalk from happening. Moreover, as stated above, when the first direction and the second direction are coincident with each other, the light-shielding stripes and the light-through stripes arranged alternately in the second direction are parallel to a column of the left-eye pixels or a column of the right-eye pixels, thereby suppressing crosstalk from happening as well.

As stated above, in order to achieve separation between the left-eye pixel imaging regions and the right-eye pixel imaging regions spatially, the parallax barrier layer may include a common electrode, a plurality of strip-like electrodes arranged in parallel in the second direction, and a liquid crystal layer arranged between the common electrode and the plurality of strip-like electrodes. In one possible embodiment, the plurality of strip-like electrodes are arranged periodically according to a repetition set, within which the plurality of strip-like electrodes are connected with the plurality of control signal lines in a one-to-one manner. Specifically, an example of the parallax barrier layer can be found in FIG. 6 and FIG. 7 and their corresponding description herein, which will not be elaborated again.

As stated above, due to hardware limitation, there exists limitation imposed on the translation of the light-shielding stripe pattern in terms of precision and range, thereby there may exist a possibility of failing to achieve an improvement on the display effect to an ideal degree. To this end, the 3D display method may include a step of enabling the image to be displayed to translate in the vicinity of the predetermined baseline position, based on the positions of both eyes of the viewer (not shown).

Therefore, according to the above embodiment of the present disclosure, an adaptive adjustment is performed on light-through openings within the parallax barrier with respect to positions of both eyes of a viewer in conjunction with tracing the positions of both eyes of the viewer. Accordingly, occurrence of Moire can be suppressed effectively. In the meantime, crosstalk deficiency due to scattering of light rays at the light-through openings can also be suppressed, by adaptively setting an angle between the first direction and the second direction. Therefore the above embodiments of the present disclosure can reduce Moire and crosstalk deficiencies in a parallax-barrier-type 3D display device, thereby improving the display effect of such a 3D display device.

As illustrated in the description of the present disclosure, terms like "upper", "lower", "above" "on" or "under" only indicate a relative orientation or positional relation based on the drawings, which is only for the purpose of simplified description, and is not implying or indicating the referred component or element must have this particular orientation, arranged or operated in this particular manner, and they should not be construed as any limitation to the present disclosure. Unless otherwise defined, terms like "mount", "connect" and "couple" should be construed as widely as possible. For example, it can be understood as a fixed connection, a detachable connection, or an integral connection, a mechanical connection, an electrical connection, a direct connection, or a connection through any intermediate media, or even an internal communication within two elements. As for a skilled person in the art, the above terms can be well understood in the present disclosure according to real situations.

Although a large number of details have been given in the Specification of the present disclosure, embodiments of the present disclosure may well be achieved without these details. In some examples, in order not to obscure understanding of the Specification, many well-known methods, structures and techniques are not illustrated in detail. Alike, in the detailed description for the example embodiments of the present disclosure, it should be appreciated that, many features have been grouped into one single embodiment, one single figure or its corresponding description, for the sake of simplification and better understanding one or more aspects of the present disclosure. However, it is not intended to require the claimed invention needs more features than those clearly recited in each of the claims. More precisely, as recited in the claims, the claimed invention needs fewer features than all features disclosed in one single embodiment. Therefore, the claims which conform to specific embodiments are all incorporated into the detailed description, in which each of the claims should be construed as one single embodiment of the present disclosure.

It should be noted that all embodiments are only for the purpose of description, not for the purpose of limitation. And a skilled person in the art can design all kinds of alternatives without departing from the protection scope of the appended claims. In the claims, any reference numerals within the parentheses should not be construed as any limitation to the present disclosure. The term "include" or "comprise" does not exclude any other elements or steps not appeared in the claims. The articles "a", "an", "the" and "said" are intended to mean that there are one or more of the elements. The present disclosure can be implemented by several different hardware elements and a properly programmed computer. In a claim defined by several units or modules, several units or modules in these devices can be achieved by a same hardware element. Terms like "first", "second", "third" and so on do not indicate any order, and can be construed as a particular name only.

It should be understood that the aforesaid embodiments are only for the sake of illustrating the technical solution and not to be taken by way of limitation. Although the present disclosure has been illustrated in detail with reference to the aforesaid embodiments, it is clearly understood by those skilled in the art that various modifications to the technical solution described in the aforesaid embodiments or equivalent replacements to part or all of the technical features can be made without departing from the spirit and scope of the present subject matter. Such modifications and equivalent replacements should be covered by the appended claims and Specification of the disclosure.

What is claimed is:

1. A three-dimensional display device, comprising a display panel and a parallax barrier layer arranged thereon, wherein the display panel includes left-eye pixels and right-eye pixels arranged alternately in a first direction; the parallax barrier layer is configured to form a light-shielding stripe pattern, in which stripes are arranged in a second direction, so as to separate imaging regions for the left-eye pixels from imaging regions for the right-eye pixels spatially, the 3D display device further comprising:

a tracing unit configured to trace positions of both eyes of a viewer;

a determining unit coupled to the tracing unit and configured to determine an offset of the light-shield stripe pattern with respect to a predetermined baseline position in a second direction under a predetermined condition, based on the positions of both eyes of the viewer obtained by the tracing unit; and a controlling unit coupled to the determining unit and configured to transmit a control signal to the parallax barrier layer based on the offset obtained by the determining unit, such that the light-shielding stripe pattern formed by the parallax barrier layer is translatable in the second direction based on the offset, wherein an angle between the first direction and the second direction is $\arctan(1/N)$, where N is one of (i) an aspect ratio of any one of the left-eye pixels, and (ii) an aspect ratio of any one of the right-eye pixels.

2. The 3D display device according to claim 1, wherein the light-shielding stripe pattern includes light-shielding stripes and light-through stripes; and the predetermined condition is that a center point between a center on a light-outgoing surface of a left-eye pixel and a center on a light-outgoing surface of a corresponding right-eye pixel, a center point between both eyes of the viewer, and a center point of a corresponding light-through stripe are all arranged in a same straight line.

3. The 3D display device according to claim 2, further comprising:

an image translation unit configured to translate the image to be displayed in the vicinity of the predetermined baseline position, based on the positions of both eyes of the viewer obtained by the tracing unit.

4. The 3D display device according to claim 2, wherein the parallax barrier layer further includes a substrate on which the light-shielding stripe pattern is formed; and a micro-mechanical mechanism which drives the substrate to move in the second direction.

5. The 3D display device according to claim 2, wherein the parallax barrier layer includes a liquid crystal layer, such that the light-shielding stripe pattern is formed by controlling the liquid crystal layer.

6. The 3D display device according to claim 1, wherein the parallax barrier layer includes a liquid crystal layer, such that the light-shielding stripe pattern is formed by controlling the liquid crystal layer.

7. The 3D display device according to claim 6, wherein the parallax barrier layer further includes a common electrode and a plurality of strip-like electrodes arranged in parallel in the second direction, wherein the liquid crystal layer is arranged between the common electrode and the plurality of strip-like electrodes;

the plurality of strip-like electrodes are connected with a plurality of control signal lines respectively, so as to enable the light-shielding stripe pattern to translate based on the offset by controlling an activation voltage applied to the plurality of control signal lines.

8. The 3D display device according to claim 7, wherein the plurality of strip-like electrodes are grouped into a plurality of electrode sets each including a same number of electrodes in the second direction;

a number of electrodes in each electrode set is the same as a number of control signal lines; and the electrodes in each electrode set are connected with the control signal lines respectively.

9. The 3D display device according to claim 1, further comprising:
an image translation unit configured to translate the image to be displayed in the vicinity of the predetermined baseline position, based on the positions of both eyes of the viewer obtained by the tracing unit.

10. The 3D display device according to claim 1, wherein the parallax barrier layer further includes a substrate on which the light-shielding stripe pattern is formed; and a micro-mechanical mechanism which drives the substrate to move in the second direction.

11. A three-dimensional display method, which is applied to a 3D display device, the 3D display device comprising a display panel and a parallax barrier layer arranged thereon, wherein the display panel includes left-eye pixels and right-eye pixels arranged alternately in a first direction; the parallax barrier layer is configured to form a light-shielding stripe pattern, the method comprising:
tracing positions of both eyes of a viewer;
determining an offset of the light-shield stripe pattern with respect to a predetermined baseline position in a second direction under a predetermined condition, based on the positions of both eyes of the viewer, wherein stripes in the light-shielding stripe pattern are arranged in the second direction, so as to separate imaging regions for the left-eye pixels from imaging regions for the right-eye pixels spatially; and
transmitting a control signal to the parallax barrier layer based on the offset, such that the light-shielding stripe pattern formed by the parallax barrier layer is translatable in the second direction based on the offset,
wherein an angle between the first direction and the second direction is arctan(1/N), where N is one of (i) an aspect ratio of any one of the left-eye pixels, and (ii) an aspect ratio of any one of the right-eye pixels.

12. The method according to claim 11, wherein the predetermined condition is that a center point between a center on a light-outgoing surface of a left-eye pixel and a center on a light-outgoing surface of a corresponding right-eye pixel, a center point between both eyes of the viewer, and a center point of a corresponding light-through stripe in the light-shielding stripe pattern are all arranged in a same straight line.

13. The method according to claim 12, further comprising:
translating the image to be displayed in the vicinity of the predetermined baseline position, based on the positions of both eyes of the viewer.

14. The method according to claim 11, wherein the parallax barrier layer further includes a common electrode, a plurality of strip-like electrodes arranged in parallel in the second direction, and a liquid crystal layer arranged between the common electrode and the plurality of strip-like electrodes, such that the light-shielding stripe pattern is caused to translate based on the offset by controlling an activation voltage applied to a plurality of control signal lines connected with the strip-like electrodes.

15. The method according to claim 14, wherein the plurality of strip-like electrodes are grouped into a plurality of electrode sets each including a same number of electrodes in the second direction;
a number of electrodes in each electrode set is the same as a number of control signal lines; and
the electrodes in each electrode set are connected with the control signal lines respectively, such that the light-shielding stripe pattern is caused to translate based on the offset by controlling the activation voltage applied to the control signal lines connected with the electrodes in each electrode set.

16. The method according to claim 11, further comprising:
translating the image to be displayed in the vicinity of the predetermined baseline position, based on the positions of both eyes of the viewer.

* * * * *